US012455272B2

(12) United States Patent
Iversen

(10) Patent No.: US 12,455,272 B2
(45) Date of Patent: Oct. 28, 2025

(54) HAND CARRIED ENHANCED SOIL PENETROMETER SYSTEM

(71) Applicant: The United States of America, as represented by the Secretary of Agriculture, Washington, DC (US)

(72) Inventor: William M. Iversen, Sidney, MT (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 268 days.

(21) Appl. No.: 18/106,101

(22) Filed: Feb. 6, 2023

(65) Prior Publication Data
US 2024/0264138 A1    Aug. 8, 2024

(51) Int. Cl.
*G01N 33/24* (2006.01)
*E02D 1/02* (2006.01)
*G01N 3/42* (2006.01)

(52) U.S. Cl.
CPC .............. *G01N 33/24* (2013.01); *E02D 1/022* (2013.01); *G01N 3/42* (2013.01)

(58) Field of Classification Search
CPC ........... G01N 33/24; G01N 3/42; E02D 1/022
See application file for complete search history.

(56) References Cited

U.S. PATENT DOCUMENTS

| | | | | |
|---|---|---|---|---|
| 3,712,121 A | * | 1/1973 | Fletcher | G01N 3/40 73/84 |
| 5,663,649 A | * | 9/1997 | Topp | G01R 27/2676 324/643 |
| 7,617,718 B2 | * | 11/2009 | Kinast | G01N 3/48 73/84 |
| 2005/0151035 A1 | * | 7/2005 | Crain | G01C 15/06 248/163.1 |

(Continued)

FOREIGN PATENT DOCUMENTS

| | | | |
|---|---|---|---|
| CN | 204959722 U | * | 1/2016 |
| CN | 217810908 U | * | 11/2022 |

(Continued)

OTHER PUBLICATIONS

WO-2007052481-A1, English Translation (Year: 2007).*

(Continued)

*Primary Examiner* — Ryan D Walsh
(74) *Attorney, Agent, or Firm* — John Fado; Maria Restrepo-Hartwig

(57) ABSTRACT

The hand carried enhanced penetrometer includes an electrical linear actuator system to advance a soil penetration rod into a test site soil during a penetrometer test. The penetrometer also includes a base plate system that uses an operator's static body weight to anchor the penetrometer to a test site surface during a penetrometer test. In operation, an operator places at least one foot on a penetrometer structural base plate and activates the linear actuator to advance a penetration rod into the test site soil. The tripod embodiment of the (Continued)

system includes an operator's seat that allows an operator to conduct a penetrometer test in a seated position while passively anchoring the penetrometer in place at the test site. The invention includes monopod, bipod, and tripod embodiments.

18 Claims, 5 Drawing Sheets

(56) References Cited

U.S. PATENT DOCUMENTS

| | | | |
|---|---|---|---|
| 2010/0018296 A1* | 1/2010 | Zacny | E02D 1/022 |
| | | | 73/84 |
| 2011/0226044 A1* | 9/2011 | Hughes | G01N 3/42 |
| | | | 73/54.02 |

FOREIGN PATENT DOCUMENTS

| | | | | |
|---|---|---|---|---|
| FR | 2986247 A1 * | 8/2013 | | E02D 5/36 |
| WO | WO-2007052481 A1 * | 5/2007 | | E02D 1/022 |

OTHER PUBLICATIONS

CN-204959722-U, English Translation (Year: 2016).*
CN-217810908-U, English Translation (Year: 2022).*
FR-2986247-A1, English Translation (Year: 2013).*

* cited by examiner

HAND CARRIED ENHANCED SOIL PENETROMETER SYSTEM

FIELD OF THE INVENTION

The disclosed subject matter relates to soil penetrometers. Specifically, the subject matter described herein relates to a hand carried enhanced penetrometer system which includes an electrical or hydraulic mechanical assistance mechanism and an anchoring system structured to use an operator's body weight to anchor the penetrometer to a test site surface during a cone penetrometer test.

BACKGROUND OF THE INVENTION

A penetrometer is an apparatus/system used to conduct a cone penetrometer (or cone penetration) test. In its simplest form, a cone penetration test generally measures the resistance of soil to penetration i.e. the soil's "strength". The resistance is measured by using the penetrometer to advance a standardized cone at the end of a penetration rod into a test site soil at a controlled rate. The resistance is typically measured in units of pounds per square inch (psi) or kilopascals (kPa). The criteria for a successful penetrometer test are defined in ASAE EP542.1. The cone penetrometer test is one of the most widely used and accepted methods for soil characterization worldwide.

Soil penetrometers are traditionally grouped into two general design categories (1) relatively large mechanically driven cone penetrometers, and (2) smaller manual cone penetrometers. The large mechanically driven penetrometers are usually hydraulically or electrically driven and are frequently mounted on a tractor, truck or trailer.

The smaller manual penetrometers typically rely on an operator's physical strength to slowly advance the penetrometer rod into the test site soil. These manual penetrometers require an operator to exert a downward force on a "T" handle-type device (or some other manual means) to force the penetrometer rod into the soil. Significant operator strength and endurance is sometimes required to maintain the penetrometer in the correct position and steadily advance the penetrometer probe into the ground. Often considerable lifting force is required as well in tight soils to retract the probe. Successfully conducting a penetrometer test is particularly challenging when the targeted soil is dry and compacted and multiple test sites must be measured during a relatively short testing period.

For the purposes of this disclosure, the rod advanced by a penetrometer during a penetrometer test is defined as (interchangeably) a "penetrometer rod", a "penetration rod", "penetrometer penetration rod", or a "probe". As noted supra, a standardized cone is fitted onto an end of the penetration rod.

Although manual penetrometers are available for small-scale limited testing, and larger scale vehicle-mounted penetrometers are available for more extensive testing that requires heavier machinery, the need exists for a mid-range penetrometer that is portable and light enough to be carried by a single operator, but capable of performing relatively rigorous testing. The current invention comprises a hand carried portable enhanced penetrometer that includes an electrical or hydraulic mechanical assistance mechanism/means to advance the penetrometer downward into the test site soil.

For the purposes of this disclosure, a "hand carried enhanced penetrometer" or "enhanced penetrometer" is a penetrometer that is compact and light enough to be carried on and off of a job site by a single operator and includes a mechanical assist device such as an electrical or hydraulic actuator or motor mechanism. For the purposes of this disclosure, a "hand carried enhanced penetrometer" is defined as weighing less than about 22 pounds (10 kilograms). Further, as a hand carried enhanced penetrometer drives a penetration rod downwardly into the test site soil, there is an upward counterforce transferred to the penetrometer that must be managed by an operator to keep the penetrometer stable and properly centered on the test site surface. To control this force, the hand carried enhanced penetrometer comprises a base plate system that anchors the enhanced penetrometer to the test site surface during a penetrometer test. The inventor's tripod embodiment also includes a seat component that may further be used to anchor the penetrometer.

Essentially, the hand carried enhanced penetrometer design described herein enables an operator to remain in an ergonomic and comfortable position while performing a penetrometer test that previously would have been done using a manual penetrometer. Relative to the manual penetrometer process, using the hand carried enhanced penetrometer significantly reduces the frequency of errors attributed to operator fatigue-including errors associated with uneven and inconsistent penetrometer rod insertion rates.

SUMMARY OF THE INVENTION

This disclosure is directed to a hand carried enhanced penetrometer. The system comprises a structural frame with one or more vertical structural elements comprising a monopod, bipod, or tripod structure/embodiment. An actuator connected to and supported by the structural frame advances and retracts a penetrometer rod during a penetration test. At least one base plate is rigidly connected to the base of the penetrometer frame to anchor the hand carried enhanced penetrometer to the test site surface. In the tripod embodiment, the system also includes an operator's seat to further anchor the system.

In operation, during a penetrometer test, as the hand carried enhanced penetrometer actuator advances the penetrometer rod into the test site soil, an operator directs his/her body weight to at least one base plate so that the penetrometer is anchored to the test site ground by the operator's static body weight. In the tripod embodiment, the operator sits on the operator's seat (which is connected to the penetrometer frame) so that the operator's static body also (passively) anchors the penetrometer.

Note that assemblies/systems in some of the FIGs. may contain multiple examples of essentially the same component. For simplicity and clarity, only a small number of the example components may be identified with a reference number. Unless otherwise specified, other non-referenced components with essentially the same structure as the exemplary component should be considered to be identified by the same reference number as the exemplary component.

DETAILED DESCRIPTION OF PREFERRED EMBODIMENTS

FIGS. 1-4, show enhanced monopod 10, bipod 40, and tripod 50 embodiments of the current invention.

Monopod System

Figure 1:
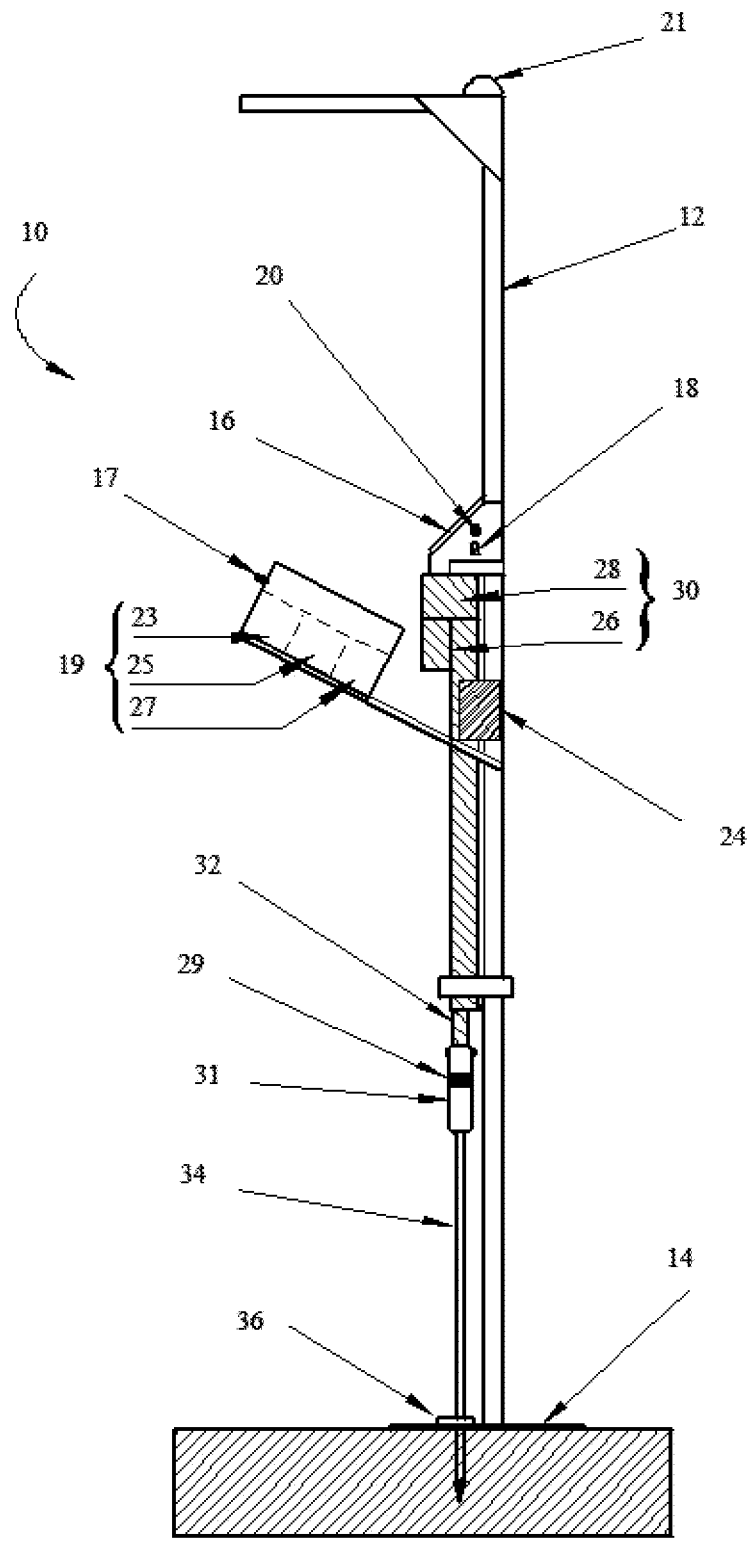
FIG. 1 is a schematic view of a monopod penetrometer.

With reference to FIG. 1, the monopod embodiment 10 of the hand carried enhanced penetrometer has a light and compact design. The monopod penetrometer 10 comprises a single vertical structural element (i.e. "leg") 12 that forms the primary structural component of the penetrometer frame 12. An anchoring base plate 14 is welded to the base of the penetrometer frame 12 to anchor the frame 12 during penetrometer measurements. The base plate 14 extends parallel to the test site soil. The monopod frame 12 (as well as the bipod and tripod frames) is constructed primarily of 1-inch square aluminum tubing. In alternative embodiments, other materials such as steel and/or composite materials may be used, and the size of the structural elements may be larger or smaller as required to satisfy the structural requirements inherent in the function of the device—while minimizing weight and maintaining a compact form.

The monopod hand carried enhanced penetrometer 10 includes a control/display panel, processing, and recording system 19. Specifically, the instrument control system 19 comprises a liquid crystal control and display panel 23, a microprocessor 25, and a data logger 27. The instrument control system 19 is preferably enclosed in an at least partially transparent enclosure 22. During the measurement process, a GPS antenna 21 relays GPS information to the control system 19. The preferred embodiments of the bipod 40 and tripod 50 penetrometers also comprise essentially the same instrument control systems 19 shown and described with reference to FIG. 1.

With further reference to FIG. 1, in operation, the operator uses a handgrip 16 to vertically position the monopod penetrometer 10 at the test site. A test is initiated when the operator moves the toggle switch 18 to the 'on' position—which powers up the control and display panel, processing, and recording system 19. The operator then places a foot on the base plate 14 and leans towards the frame 12—thereby transferring most of his/her body weight to the base plate 14.

The directional control toggle switch 18 is then placed in the down position and the momentary-on pushbutton switch 20 is pressed to allow power from the battery 24 to flow to the actuator motor 26. The actuator motor 26 communicates with the gear box 28 to effectively form a linear actuator 30. The linear actuator 30 communicates with the linear actuator ram 32 to advance and retract the penetrometer rod 34 through the poly guide block 36. In the preferred embodiment, power for the linear actuator 30 is supplied by a 12-volt lithium-ion battery 24. As the penetrometer rod 34 moves downwardly through the test site soil, the depth, pressure, record count, and battery voltage are displayed and recorded by the instrument control system 19.

A potentiometer integrated into the linear actuator gearbox 28 measures the depth of penetration via the extension of the linear actuator ram 32 in relation to the base plate's 14 or a known position on the soil surface. A load cell sensor 29 inside the load cell sensor housing 31 is configured so that the force required to advance the penetrometer rod 34 is measured as the actuator ram 32 applies pressure on the load cell sensor 29 in a load cell housing 31—which communicates the force/pressure applied to the ram 32—to the instrument control system 19. In alternative embodiments, a force sensor associated with the linear actuator 30 may be used to measure the penetration force exerted by the penetrometer 10. In further alternative embodiments, any means known in the art may be used to determine force/pressure or penetration depth, including Hall effect sensors, optical, or reed sensors.

When the desired maximum depth is obtained, the operator flips the directional control toggle switch 18 to the 'up' position and presses the momentary-on button 20 so that the penetrometer rod 34 is retracted. When the penetrometer rod 34 begins to retract, the data for all records collected for the current test iteration are preferably recorded on an SD card in the data logger 27 of the instrument control system 19. In alternative embodiments, other means of recording penetrometer 10 readings may be utilized or the penetrometer data may be communicated via a wired or wireless means to a remote controller/processor/recorder.

Bipod System

Figure 2:
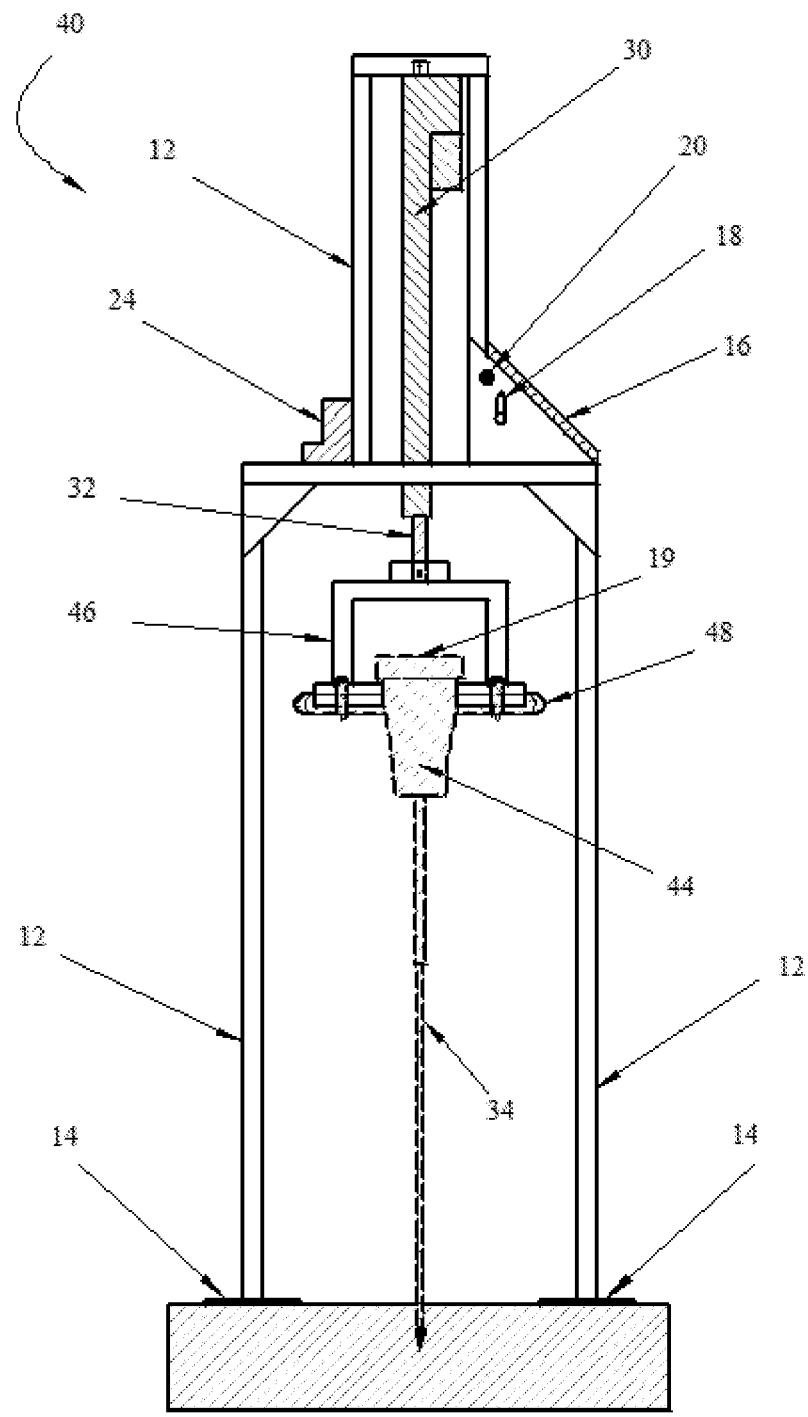
FIG. 2 is a schematic front view of a bipod penetrometer.

As shown in FIG. 2, the bipod embodiment 40 of the hand carried enhanced penetrometer comprises two frame "legs" 12 so that the penetrometer penetration rod 34 penetrates the test site surface between the two legs 12. The inventor's bipod embodiment 40 comprises an instrument control system 19 that is positioned in the top of a penetration rod centering and guiding apparatus 44. Similar to the configuration for the monopod 10, the instrument control system 19 includes a display and control panel 23, a microprocessor 25, and a datalogger 27. The rod centering and guiding apparatus 44 may also comprise a penetration force measuring sensor/apparatus. In an alternative embodiment, the force measuring apparatus may be incorporated into the bipod linear actuator 30. In a further alternative embodiment, penetration force may be measured via a load cell sensor 29 enclosed within the rod centering and guide housing 44.

The bipod linear actuator 30 is attached to the penetration rod center and guiding apparatus 44 via a linear actuator ram 32. Specifically, the linear actuator ram 32 is attached to a yoke 46—which is then attached to a T-bar-type handle 48—which drives the rod centering and guiding apparatus 44. In one embodiment, a potentiometer measures the penetrometer penetration depth based on the extension of the linear actuator ram 32.

With reference to FIG. 2, in operation, an operator places at least one foot on one of the base plates 14, and places one hand on a handgrip 16. To initiate penetration, the operator flips a directional toggle switch 18 to a down position and leans forward to view the instrument control system 19 control and display panel 23. The operator then presses a momentary-on pushbutton switch 20, which activates the linear actuator 30. The linear actuator 30 draws power from a 12-volt lithium-ion battery 24 and forces the penetrometer rod 34 into the soil at a steady rate.

The operator's static body weight anchors the base plates 14 to the soil surface. When the desired depth is reached, the directional toggle switch 18 is flipped to the up position and the pushbutton 20 is again pressed to withdraw the penetrometer rod 34. No strain is exerted on the operator's back as the operator remains in an upright position and the linear actuator 30 provides the lifting force. As noted supra, in further alternative embodiments, any means known in the art may be used to determine force/pressure or penetration depth, including Hall effect sensors, optical, or Reed sensors.

If extremely compacted soil or a stone is encountered, the base plates 14 may be inadvertently lifted off the soil surface and, if the operator has both feet on the base plates 14, a momentary loss of balance may occur. This is the reason the pushbutton switch 20 is a momentary contact type control— as it is instinctively released (and the penetration rod 34 stops moving downwardly) if the operator becomes unstable. After the bipod penetrometer 40 test is complete, the operator grasps the frame 12 of the penetrometer 40 with one hand and the unit 40 is carried horizontally (with the penetrometer rod 34 still attached) to the next test site location.

Tripod System

Figure 3:
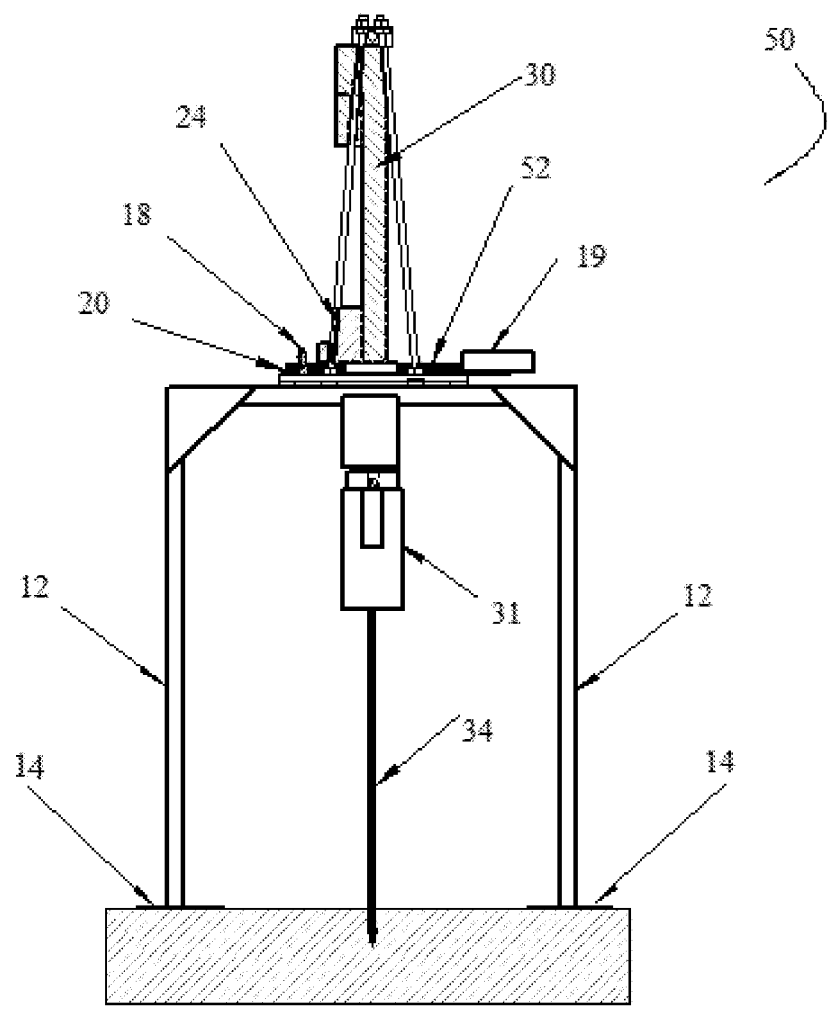
FIG. 3 is a schematic front view of a tripod penetrometer.
Figure 4:
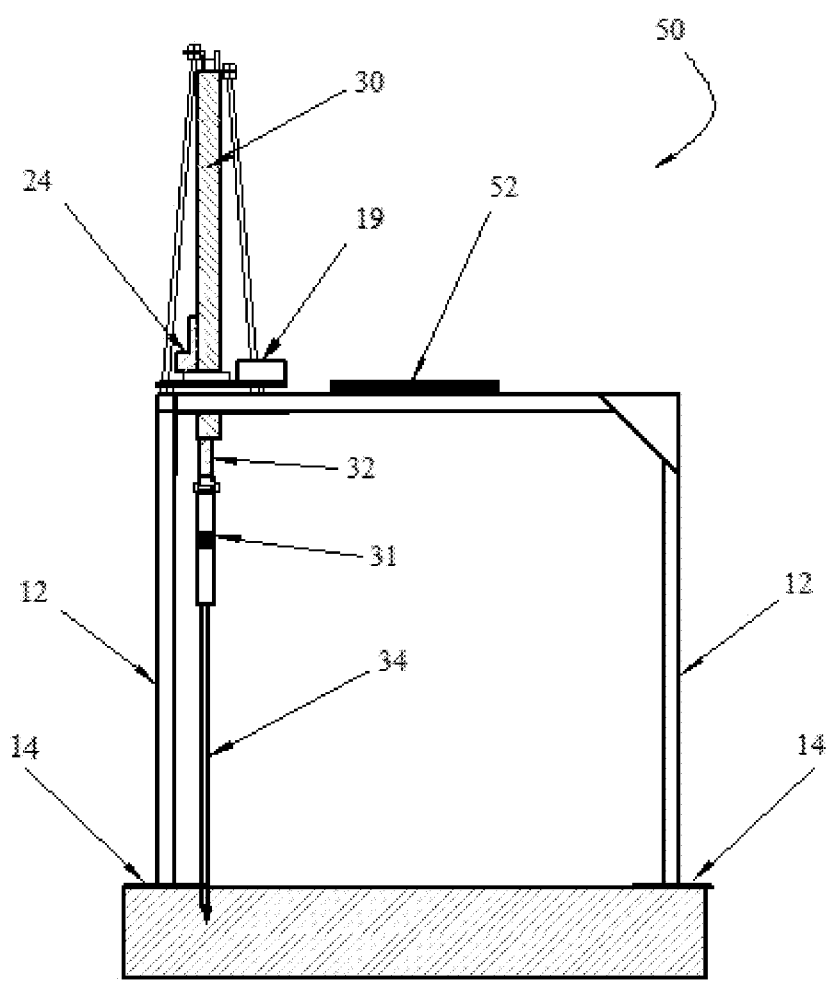
FIG. 4 is a schematic side view of a tripod penetrometer.
Figure 5:
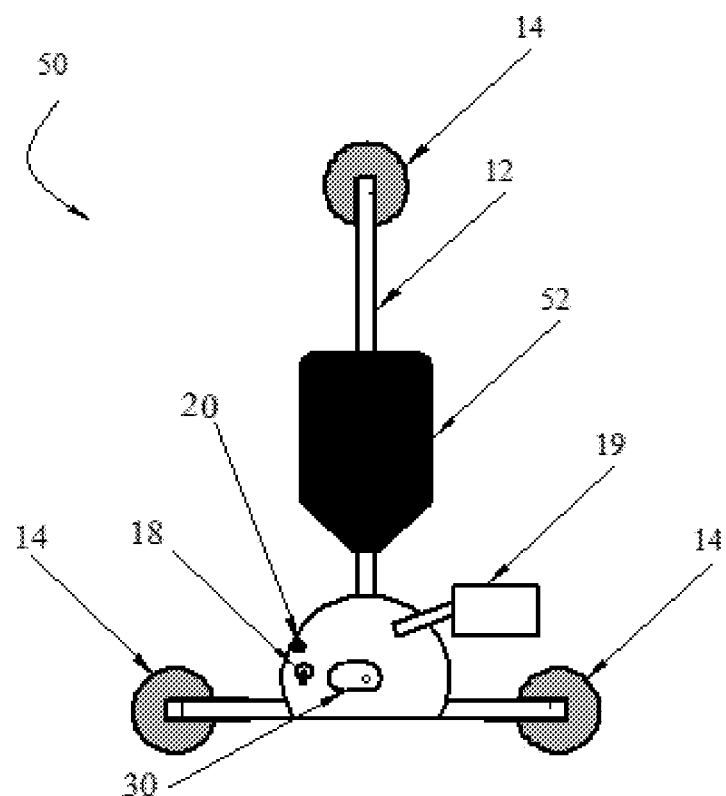
FIG. 5 is a schematic top view of a tripod penetrometer.

As shown in FIGS. 3-5, the hand carried enhanced penetrometer tripod system 50 comprises a generally T-shaped frame 12 (when viewed from above) and incudes an operator seat 52 that is built into the frame 12. As with the monopod 10 and bipod 40 systems, the tripod 50 includes at least one base plate 14 to anchor the tripod 50 to the test site. Specifically, three base plates 14 are used to anchor the tripod 50 to the test site soil. The operator may elect to place at least one foot on a base plate 14 while sitting on seat 52 to ensure the lateral stability of tripod if extremely compacted soil or a stone is encountered.

In the preferred embodiment, the tripod 50 load cell penetrometer pressure measuring system is similar to the monopod embodiment 10. Specifically, the tripod design includes a load cell sensor 29 mounted in a load cell housing 31 that measures pressure exerted on a penetrometer rod 34 by the linear actuator ram 32. In alternative embodiments, penetrometer pressure may be measured by a pressure sensor integrated into the linear actuator 30, or by any means known in the art.

Further, in the tripod embodiment 50, penetration depth is measured by a potentiometer associated with the extension of linear actuator ram 32. In alternative embodiments, penetration depth may be determined by an ultrasonic sensor. While there are some advantages to using ultrasonic sensors, ultrasonic sensors are unusable in windy conditions, and difficult to use where the soil surface is uneven. In further embodiments, the penetration depth may be measured by any means known in the art.

In a preferred embodiment, the tripod penetrometer instrument control system 19 is essentially identical to the monopod 10 and bipod 40 instrument control systems 19. However, in alternative embodiments, the instrument control system 19 components may be reconfigured to accommodate the tripod frame 12 and to be more accessible to an operator. Additionally, the tripod penetrometer rod 34 is shortened so that the tripod operator's seat 52 is at a comfortable height.

As best shown in FIG. 5, a single operator may stand on the base plates 14 attached to the tripod legs that are closest to the penetration rod 18 penetration site, or the operator may sit on a seat 52 positioned on an upper surface of the tripod penetrometer frame 12. Significantly, the combination of the electrical/hydraulic linear actuator assistance and the tripod base plate 14/seat 52 anchoring system makes the penetrometer test process significantly less physically rigorous and expands the number of people/operators who are physically capable of performing penetrometer tests. In a particularly challenging testing scenario where the soil is difficult to penetrate, the anchoring force may be maximized by positioning an operator on the tripod seat and directing additional operator assistants to stand on each of the three tripod base plates 14 so that the anchoring force is maximized.

In operation, the tripod penetrometer operator sits on the operator's seat 52 and flips a directional toggle switch 18 to a down position and presses the momentary-on button 20 to lower the penetrometer rod 34 downward to the soil surface. The operator also initiates monitoring by the instrument control system 19. The operator continues to press the momentary on button 20 to power the linear actuator 30 and thereby force the penetrometer rod 34 downward into the soil.

The tripod linear actuator 30 may be controlled by a motor controller—which also includes a speed adjustment control. The tripod motor is powered by a 12-volt DC battery. While the tripod embodiment shown in FIGS. 3-5 uses a potentiometer associated with the linear actuator ram 32 to measure penetration depth, other types of depth sensors should be considered to be within the scope of the invention. Although the ultrasonic sensor is simpler and useable in ideal conditions, the sensor is susceptible to multi-path reflections which may result in data errors that render the data useless. As noted supra, any means known in the art including Hall effect, reed, or optical sensors should be considered within the scope of the invention.

When the desired depth is reached, the switch 18 is toggled to the "up" position and the momentary-on button 20 is pressed to withdraw the penetrometer rod 34. Again, the operator's static body weight (as applied to the operator's seat 52) provides the anchoring force required to allow the linear actuator 30 to insert and withdraw the penetrometer rod 34 with minimal physical effort required by the operator. Of the three embodiments, the tripod embodiment 50 is particularly important because it allows people with varying physical abilities to operate the penetrometer 50 and conduct penetrometer tests-who may not have been otherwise able to perform the penetrometer measurements.

As noted supra, the penetrometers described herein are functionally "portable devices". For the purposes of this disclosure, a "portable" device is defined as a device that can be carried onto and off of a job site by a single average operator.

The penetrometers described herein are also functionally "single operator devices". For the purpose of this disclosure a "single operator device" is defined as a device wherein a single operator acting alone can conduct routine testing procedures.

For the foregoing reasons, it is clear that the subject matter described herein provides an innovative cone penetrometer test system that may be used in at least three different embodiments. The current system may be modified in multiple ways and applied in various technological applications. The disclosed method and apparatus may be modified and customized as required by a specific operation or application, and the individual components may be modified and defined, as required, to achieve the desired result. For example, penetrometer apparatus may also be used to extract soil core samples or as a means of making installation apertures for soil moisture measurement devices.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed in this specification are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 30" should be considered to include any and all sub-ranges between (and inclusive of) the minimum value of 1 and the maximum value of 30 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the implied term "about." If the (stated or implied) term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount. Accordingly, unless otherwise indicated, the numerical properties set forth in the following specification and claims are approximations that may vary depending on the desired properties sought to be obtained in embodiments of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein. The term "an effective amount" as applied to a component or a function excludes trace amounts of the component, or the presence of a component or a function in a form or a way that one of ordinary skill would consider not to have a material effect on an associated product or process.

What is claimed is:

1. A hand carried penetrometer system, the system comprising:
    a structural frame comprising at least one vertical structural element;
    an electrical linear actuator connected to and supported by the structural frame;
    a penetrometer rod positioned to be advanced and retracted by the actuator;
    a standardized cone at a distal end of the penetrometer rod;
    a data logger that records force required to advance the penetrometer rod at predetermined soil depths; and
    at least one base plate rigidly connected to the bottom of a vertical structural element, the base plate extending parallel to a surface of a test site soil;
        wherein the system is a hand carried penetrometer system and, during a penetrometer test, as the actuator advances the penetrometer rod into the test site soil at a steady rate, an operator directs his/her body weight to the at least one base plate so that the operator's body weight anchors the penetrometer to the test site soil; the force required to advance the penetrometer rod at predetermined soil depths; the depths being precisely measured from the base plate by measuring extension of the actuator, and recorded to the data logger together with the resistance to penetrometer rod movement through the soil.

2. The system of claim 1 wherein the linear actuator is structured so that as the linear actuator expands vertically, a linear actuator ram advances the penetrometer rod downwardly.

3. The system of claim 2 wherein the penetrometer rod is positioned in tandem with the linear actuator.

4. The system of claim 2 wherein a potentiometer positioned adjacent to the linear actuator ram measures penetration depth, and a load cell in series with the penetrometer rod measures resistance to penetrometer rod penetration.

5. The system of claim 4 wherein the system further comprises a control and display panel, a microprocessor, and a data logger, the potentiometer and the load cell being in communication with the control and display panel, the microprocessor, and the data logger.

6. The system of claim 1 wherein the system frame comprises two vertical structural elements extending upward from the test site soil so that the system comprises a bipod penetrometer system, one of the at least one base plates being attached to each of the two vertical structural elements.

7. The system of claim 6 wherein the penetrometer rod penetrates the test site soil between a first one of the two vertical structural elements and a second one of the two vertical structural elements.

8. The system of claim 1 wherein the system comprises three structural elements extending upward from the test site soil so that the system comprises a tripod penetrometer system, one of the at least one base plates being attached to each of the three vertical structural elements.

9. The system of claim 8 wherein the penetrometer rod penetrates the test site soil between two of the three vertical structural elements.

10. The system of claim 8 wherein the tripod penetrometer system further comprises an operator's seat attached to the frame so that an operator can sit on the operator's seat and further anchor the frame to the test site soil.

11. The system of claim 1 wherein the penetrometer system is structured so that the system is portable and can be moved on to, and off of, a test site by a single operator.

12. The system of claim 1 wherein the system is structured as a single operator device so that a single operator acting alone can perform routine penetrometer tests.

13. A method of conducting a penetrometer test, the method comprising the steps of:
    (a) providing the system of claim 1;
    (b) carrying the system onto the test site;
    (c) placing at least one of the operator's feet on the at the least one base plate;
    (d) lowering the penetrometer rod until the penetrometer rod reaches a targeted depth;
    (e) during step (d), recording resistance of a soil to penetration to the targeted depth; and,
    (f) retracting the penetration rod.

14. The method of claim 13 wherein, in step (c), the operator sits on an operator's seat attached to the frame to further anchor the system to the test site soil.

15. A hand carried penetrometer system, the system comprising:
    a structural frame comprising at least three vertical structural elements extending upward from a test site soil, the at least three vertical structural elements being connected by at least two horizontal structural elements so that the frame has a "T" shape when viewed from above the system;

an electric linear actuator connected to and supported by the structural frame, the linear actuator being positioned between two of the at least three vertical structural elements;

a penetrometer rod positioned to be advanced at a steady rate by the linear actuator;

a standardized penetrometer cone located at a distal end of the penetrometer rod;

a data logger that records force required to advance the penetrometer rod at predetermined soil depths;

at least one base plate rigidly connected to the bottom of a vertical structural element, the base plate extending parallel to a surface of a test site soil; and an operator's seat connected to one of the at least two horizontal structural elements;

wherein the system is a hand carried penetrometer system and, during a penetrometer test, as the actuator advances the penetrometer rod into the test site soil at a steady rate, resistance to penetrometer rod advancement at precise depths determined by measurement of extension of the actuator in relation to the base plate is recorded in the data logger as the rod moves through the soil; and the operator's body weight applied to the operator's seat anchors the penetrometer to the test site soil.

16. The system of claim 15 wherein the system further comprises a base plate attached to each of the at least three vertical structural elements, each base plate extending parallel to the test site soil.

17. A method of performing a penetrometer test, the method comprising the steps of:
(a) providing the system of claim 15;
(b) carrying the system onto the test site;
(c) positioning the operator on the operator's seat;
(d) lowering the penetrometer rod until the penetrometer rod reaches a targeted depth;
(e) during step (d), recording resistance of a soil to penetration; and,
(f) retracting the penetration rod.

18. The method of claim 15 wherein, in step (a), the system further comprises a potentiometer positioned adjacent to the linear actuator ram measuring penetration depth, and a load cell in series with the penetrometer rod measuring resistance to penetrometer rod penetration.

* * * * *